(12) United States Patent
Shi

(10) Patent No.: US 12,089,748 B1
(45) Date of Patent: Sep. 17, 2024

(54) INFLATABLE MATTRESS

(71) Applicant: Dongguan Hongyu Plastic Co., Ltd., Guangdong (CN)

(72) Inventor: Juying Shi, Guangdong (CN)

(73) Assignee: Dongguan Hongyu Plastic Co., Ltd., Guangdong (CN)

( * ) Notice: Subject to any disclaimer, the term of this patent is extended or adjusted under 35 U.S.C. 154(b) by 8 days.

(21) Appl. No.: 18/407,671

(22) Filed: Jan. 9, 2024

(30) Foreign Application Priority Data

Dec. 18, 2023 (CN) .......................... 202323460931.3

(51) Int. Cl.
| A47C 27/08 | (2006.01) |
| B32B 5/02 | (2006.01) |
| B32B 5/06 | (2006.01) |
| B32B 7/05 | (2019.01) |

(52) U.S. Cl.
CPC .......... *A47C 27/087* (2013.01); *A47C 27/081* (2013.01); *B32B 5/028* (2013.01); *B32B 5/073* (2021.05); *B32B 7/05* (2019.01); *B32B 2479/00* (2013.01)

(58) Field of Classification Search
CPC ..... A47C 27/08; A47C 27/081; A47C 27/082; A47C 27/084; A47C 27/087; A47C 27/10; B32B 5/028; B32B 5/073; B32B 7/05; B32B 2479/00
See application file for complete search history.

(56) References Cited

U.S. PATENT DOCUMENTS

| 3,120,406 | A | * | 2/1964 | Shelton | B60N 2/5635 |
| | | | | | D6/601 |
| 3,736,604 | A | * | 6/1973 | Carson, Jr. | A47C 27/087 |
| | | | | | 5/678 |
| 7,089,618 | B1 | * | 8/2006 | Metzger | A47C 27/087 |
| | | | | | 5/709 |
| 7,694,372 | B1 | * | 4/2010 | Boyd | A47C 27/081 |
| | | | | | 5/711 |
| 9,955,787 | B2 | * | 5/2018 | Snowbarger | B32B 5/26 |
| 11,503,920 | B1 | * | 11/2022 | Shi | A47C 27/10 |
| 11,547,217 | B1 | * | 1/2023 | Ayres | A47C 27/14 |
| 2006/0080778 | A1 | * | 4/2006 | Chambers | A47C 21/044 |
| | | | | | 5/652.2 |
| 2006/0280904 | A1 | * | 12/2006 | Marson | B32B 7/12 |
| | | | | | 428/116 |
| 2007/0044243 | A1 | * | 3/2007 | Metzger | A47C 27/087 |
| | | | | | 5/710 |

(Continued)

*Primary Examiner* — Justin C Mikowski
*Assistant Examiner* — George Sun
(74) *Attorney, Agent, or Firm* — Cooper Legal Group, LLC

(57) ABSTRACT

The present application relates to a technical field of inflatable mattress, and in particular, to an inflatable mattress. The inflatable mattress includes an outer surrounding sheet, an upper surrounding sheet, a lower surrounding sheet and a pull rope, in which the outer surrounding sheet is annular, a side wall of the outer surrounding sheet is provided with an inflating nozzle, the upper surrounding sheet is welded on the top of the outer surrounding sheet, the lower surrounding sheet is welded on the bottom of the outer surrounding sheet, the pull rope is passed through and connected to the upper surrounding sheet and the lower surrounding sheet, which is arranged in a wave-like route inside the inflatable mattress.

9 Claims, 7 Drawing Sheets

(56) References Cited

U.S. PATENT DOCUMENTS

| | | | | |
|---|---|---|---|---|
| 2007/0283499 A1* | 12/2007 | Lin | ........................ | A47C 27/081 |
| | | | | 5/713 |
| 2010/0209679 A1* | 8/2010 | Tompkins | .................. | B64C 1/40 |
| | | | | 428/220 |
| 2012/0175206 A1* | 7/2012 | Kanous | .................. | B32B 25/042 |
| | | | | 156/242 |
| 2014/0265485 A1* | 9/2014 | Wang | .................... | A47C 27/087 |
| | | | | 297/232 |
| 2015/0335164 A1* | 11/2015 | Liu | .......................... | F24F 1/022 |
| | | | | 156/278 |
| 2017/0196368 A1* | 7/2017 | Liu | .......................... | A47C 27/16 |
| 2018/0160820 A1* | 6/2018 | Hsu | .......................... | F04B 39/12 |
| 2020/0100598 A1* | 4/2020 | Huang | .................. | A47C 27/087 |
| 2020/0113342 A1* | 4/2020 | Stone | ..................... | A47C 27/10 |
| 2020/0187668 A1* | 6/2020 | Ocegueda Gallaga | ........................ | |
| | | | | A47C 27/087 |
| 2020/0291645 A1* | 9/2020 | Scamardo | ............... | B32B 5/028 |
| 2020/0390247 A1* | 12/2020 | Taylor | ..................... | B32B 5/073 |
| 2021/0127849 A1* | 5/2021 | Li | .......................... | A47C 27/12 |
| 2021/0196053 A1* | 7/2021 | Li | .......................... | A47C 27/10 |
| 2022/0346564 A1* | 11/2022 | Huang | .................. | A47C 27/081 |

* cited by examiner

INFLATABLE MATTRESS

CROSS-REFERENCE TO RELATED APPLICATION

This application is a priority and benefit of Chinese patent application serial no. 202323460931.3, filed on Dec. 18, 2023. The entirety of Chinese patent application serial no. 202323460931.3 is hereby incorporated by reference herein and made a part of this specification.

TECHNICAL FIELD

The present application relates to a technical field of inflatable mattress, and in particular, to an inflatable mattress.

BACKGROUND ART

An inflatable mattress is a portable bedding, which is usually made of soft materials such as PVC or rubber, and rigidity of which is adjusted by inflating or deflating. This kind of inflatable mattress is suitable for situations of temporary use such as camping, traveling, guest visiting, or other temporary sleep arrangements required.

At present, the existing inflatable mattress includes an outer surrounding sheet, an upper surrounding sheet and a lower surrounding sheet, the outer surrounding sheet is arranged in a ring, the upper surrounding sheet and the lower surrounding sheet are respectively sewed up the top surface and the bottom surface of the outer surrounding sheet. The side wall of the outer surrounding sheet is provided with a inflating nozzle, and the inflatable mattress can be shaped by inflating. In order to reinforce the strength of the inflatable mattress and to reduce the situation of causing bulges on the surface of the inflatable mattress by air flowing when the inflatable mattress is overinflated or used, a pull tab is arranged inside the improved inflatable mattress, which is annular, and the top surface and the bottom surface of the pull tab are respectively fixed to the bottom surface of the upper surrounding sheet and the top surface of the lower surrounding sheet, thereby a drawing force in a vertical direction is acted on the inflatable mattress, which can keep the inflatable mattress stable. In addition, an air nozzle is arranged on the opposite of the pull tab for air circulation.

However, due to the providing of the pull tab, two cavities having larger volume are formed inside the inflatable mattress. When the inflatable mattress needs to be inflated, there is a need to inflate the outer cavity, and, after the outer side cavity is fully inflated, the air can be flowed into the inter side cavity via the nozzle of the pull tab, and the inter side cavity further accounts for a certain volume, such that it further needs to increase more air nozzles to flow air. In addition, due to the limited connection points between the pull tab and the upper surrounding sheet, the lower surrounding sheet, it can only act on certain areas, ultimately affecting the convenience and structural stability of the inflatable mattress.

SUMMARY

In order to improve the convenience and structural stability of the inflatable mattress, the present application provides an inflatable mattress.

The present application provides an inflatable mattress, adopting the following technical solution:

An inflatable mattress, including an outer surrounding sheet, an upper surrounding sheet, a lower surrounding sheet and a pull rope, wherein the outer surrounding sheet is annular, a side wall of the outer surrounding sheet is provided with an inflating nozzle, the upper surrounding sheet is welded at a top of the outer surrounding sheet, the lower surrounding sheet is welded at a bottom of the outer surrounding sheet, the pull rope is passed through and connected to the upper surrounding sheet and the lower surrounding sheet, and arranged in a wave-like route inside the inflatable mattress.

By adopting the above technical solution, the wave-like route can provide more uniform support. The design can disperse stress points of the inflatable mattress, all parts of the body can be more uniformly supported when using the inflatable mattress, and the pull rope is passed through and connected to the upper surrounding sheet and the lower surrounding sheet, which is beneficial to dispersing the impact of the connection points. The connections of different positions can reduce partial stress on the inflatable mattress to provide more uniform support. Meanwhile, the connection is achieved by the pull rope in the relative technology, compared to a plurality of nozzles arranged on the pull rope, the air can be convenient to communicate through the inner of the inflatable mattress via the pull rope, being a higher inflating efficiency and a more convenient use, therefore, the convenience and structural stability of the inflatable mattress are indirectly improved.

Preferably, it further includes an upper panel and a lower panel, in which the upper panel and the lower panel are respectively fixed to the upper surrounding sheet and the lower surrounding sheet, the upper panel includes a first mesh layer, the lower panel includes a second mesh layer, the first mesh layer and the second mesh layer are respectively located at two sides of the pull rope, the pull rope is sequentially passed through the first mesh layer and the second mesh layer and is simultaneously connected to both of the first mesh layer and the second mesh layer.

By adopting the above technical solution, the process of connecting can be simplified by using the first mesh layer and the second mesh layer, the pull rope of sequentially threaded through and connected to both of the first mesh layer and the second mesh layer is easily achieved, compared to direct connection of the upper surrounding sheet and the lower surrounding sheet, since more connection points and structures are provided by the first mesh layer and the second mesh layer.

Preferably, a periphery of an outer side wall of the upper panel is welded to one sixth length of a circumference of an inner side wall of the upper surrounding sheet, and a periphery of an outer side wall of the lower panel is welded to one sixth length of a circumference of an inner side wall of the lower surrounding sheet.

By adopting the above technical solution, a compartment is formed by the connection manner between the upper surrounding sheet, the lower surrounding sheet and the upper panel, the lower panel, and inner structure of the inflatable mattress is more stability. Simultaneously, by welding on the position at one sixth, ensuring that enough connection points are from between the upper surrounding sheet, the lower surrounding sheet and the upper panel, the lower panel, and keeping the shape and the structure of the inflatable mattress.

Preferably, it further includes an upper inner surrounding sheet and a lower inner surrounding sheet, both of the upper inner surrounding sheet and a lower inner surrounding sheet are annular, the surface of the upper inner surrounding sheet is welded to the upper surrounding sheet, an outer side edge of the upper inner surrounding sheet is spot-welded to the outer surrounding sheet, a surface of the lower inner surrounding sheet is welded to a surface of the lower surrounding sheet, and an outer side edge of the lower inner surrounding sheet is spot-welded to the outer surrounding sheet.

By adopting the above technical solution, the upper inner surrounding sheet can pull the upper surrounding sheet and the outer surrounding sheet in an opposite direction, the lower inner surrounding sheet can pull the lower surrounding sheet and the outer surrounding sheet in an opposite direction, such that the upper surrounding sheet, the lower surrounding sheet and the outer surrounding sheet are affected by tension, improving the overall structural stability of the inflatable mattress; Meanwhile, the space enclosed by the upper inner surrounding sheet and the outer surrounding sheet, the lower inner surrounding sheet and the outer surrounding sheet are provided for inflation conditions in a manner of spot welding, such that the inflatable mattress can inflate stably.

Preferably, a periphery of an outer side wall of the upper inner surrounding sheet is welded to one fourth length of a circumference of an inner side wall of the upper surrounding sheet, and a periphery of an outer side wall of the lower inner surrounding sheet is welded to one fourth around the inner side wall of the lower surrounding sheet.

By adopting the above technical solution, a periphery of an outer side wall of the upper inner surrounding sheet is welded to one fourth length of a circumference of an inner side wall of the upper surrounding sheet, and a periphery of an outer side wall of the lower inner surrounding sheet is welded to one fourth around the inner side wall of the lower surrounding sheet, which can balance support points of the inflatable mattress, reducing the stress on the welding points, thereby improving the overall comfort.

Preferably, the lower surrounding sheet is provided with a plurality of weight blocks arranged in an array around the lower surrounding sheet.

By adopting the above technical solution, the weight block is arranged at the four corners of the inflatable mattress, which is further beneficial to reducing the risk of air leakage, thereby ensuring that the inflatable mattress is fixed on the ground when in use, reducing the problems of wear and tear and air-escaping at the joint because of moving.

Preferably, a guide sleeve is arranged between the upper surrounding sheet and the lower surrounding sheet, and the weight block is slidably provided in the guide sleeve.

By adopting the above technical solution, the guide sleeve is designed as a guide passage, which can conduct the weight block to slide in a certain direction, ensuring that the weight block is moved along the planned route during the process of flipping the inflatable mattress, however is not slid randomly or piled in a side of the inflatable mattress.

Preferably, a plurality of air holes are defined in a periphery of the guide sleeve.

By adopting the above technical solution, when the inflatable mattress is inflated, the air can enter the guide sleeve through the air hole, such that the inner of the guide sleeve is supported by air, since four corners of the traditional inflatable mattress is easy to collapse by affecting of stress, four corners of the inflatable mattress can be supported through the guide sleeve in the present application, indirectly improving the structural strength of the inflatable mattress.

Preferably, it further includes two separating sheets and a plurality of perforated pull straps, an outer side wall of the two separating sheets are fixed to an inner side wall of the outer surrounding sheet, in which two ends of some of the perforated pull strap are fixed to the top surface of one separating sheet and the upper surrounding sheet, and two ends of other perforated pull strap are fixed to a bottom of the other separating sheet and the lower surrounding sheet.

By adopting the above technical solution, due to the arrangement of the separating sheet and the fixing of the perforated pull strap, inner of the mattress is separated and connected, thereby improving the overall structural stability and uniform inflation effects.

Preferably, wave-like folds are provided on surfaces of the upper surrounding sheet and the lower surrounding sheet.

By adopting the above technical solution, it is beneficial to realizing more uniform when the inflatable mattress is inflated.

In summary, at least one of the following beneficial technical effects is achieved:

1. Wave-like route can provide more uniform support. The design can disperse stress points of the inflatable mattress, all parts of the body can be more uniformly supported when are in use of the inflatable mattress, and the pull rope is threaded through and connected to the upper surrounding sheet and the lower surrounding sheet, which is beneficial to dispersing the impact of the connection points. The connections of different positions can reduce local stress on the inflatable mattress to provide more uniform support. Meanwhile, the connection is achieved by the pull rope in the relative technology, compared to a plurality of nozzles arranged on the pull rope, the air can be convenient to circulate inside the inflatable mattress via the pull rope, providing a higher inflating efficiency and a more convenient use, therefore, the convenience and structural stability of the inflatable mattress are indirectly improved;
2. A compartment is formed by the connections of the upper surrounding sheet, the lower surrounding sheet and the upper panel, the lower panel, and inner structure of the inflatable mattress is more stability. In addition, by welding on the position at one sixth length of a circumference of an inner side wall of the upper surrounding sheet, it is ensured that enough connection points are from between the upper surrounding sheet, the lower surrounding sheet and the upper panel, the lower panel, and keeping the shape and the structure of the inflatable mattress;
3. The upper inner surrounding sheet can pull the upper surrounding sheet and the outer surrounding sheet in an opposite direction, the lower inner surrounding sheet can pull the lower surrounding sheet and the outer surrounding sheet in an opposite direction, such that the upper surrounding sheet, the lower surrounding sheet and the outer surrounding sheet are affected by tension, improving the overall structural stability of the inflatable mattress. Meanwhile, the space enclosed by the upper inner surrounding sheet and the outer surrounding sheet, the lower inner surrounding sheet and the outer surrounding sheet are provided for inflation conditions in a manner of spot welding, such that the inflatable mattress can inflate stably.

Listing of reference signs: 1. outer surrounding sheet; 11. inflating nozzle; 12. handle; 2. upper surrounding sheet; 3. lower surrounding sheet; 4. pull rope; 5. upper panel; 51. first connection layer; 52. first mesh layer; 6. lower panel; 61. second connection layer; 62. second mesh layer; 7. weight block; 71. magnetic layer; 8. guide sleeve; 81. air hole; 9. upper inner surrounding sheet; 10. lower inner surrounding sheet; 12. separation sheet; 13. drawstring with hole; 14. wave-like fold.

DETAILED DESCRIPTION

The present application is further described in detail below in combination with FIGS. 1-7.

Embodiment 1

Figure 1:
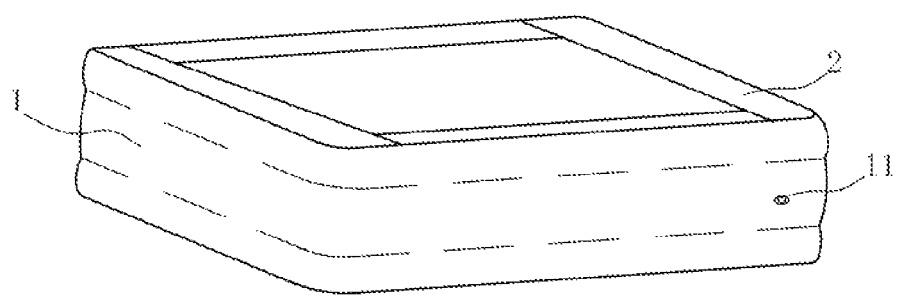
FIG. 1 is an overall schematic view of an inflatable mattress according to Embodiment 1 of the present application.
Figure 2:
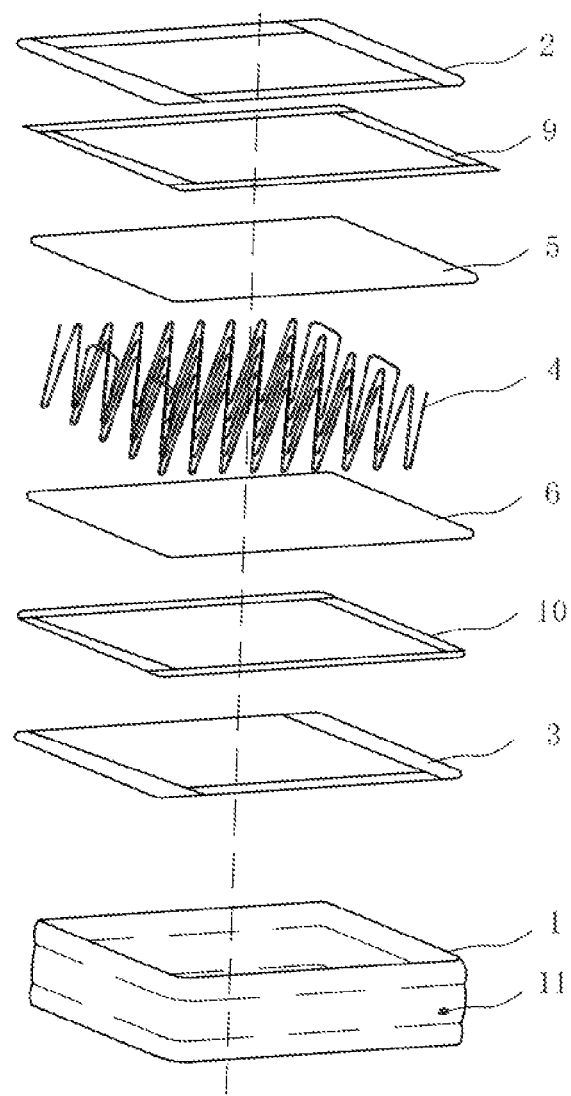
FIG. 2 is a schematic exploded view of the inflatable mattress according to Embodiment 1 of the present application.

Embodiment 1 of the present application discloses an inflatable mattress. Referring to FIG. 1 and FIG. 2, an inflatable mattress includes an outer surrounding sheet 1, an upper surrounding sheet 2, a lower surrounding sheet 3 and a pull rope 4. The outer surrounding sheet 1 is annular, a side wall of the outer surrounding sheet 1 is provided with a air nozzle 11, the upper surrounding sheet 2 is welded on the top of the outer surrounding sheet 1, the lower surrounding sheet 3 is welded on the bottom of the outer surrounding sheet 1, the upper surrounding sheet 2 and the lower surrounding sheet 3 are horizontally arranged, the pull rope 4 is passed through the upper surrounding sheet 2 and the lower surrounding sheet 3, a plurality of connecting joints are formed between the pull rope 4 and the upper surrounding sheet 2, the lower surrounding sheet 3. Specifically, the end portion of the pull rope 4 passes through the upper surrounding sheet 2 in a manner of passing from bottom to up, and passes through the lower surrounding sheet 3 in an opposite direction, so as to realize the fixing of the upper surrounding sheet 2 and the lower surrounding sheet 3.

Figure 3:
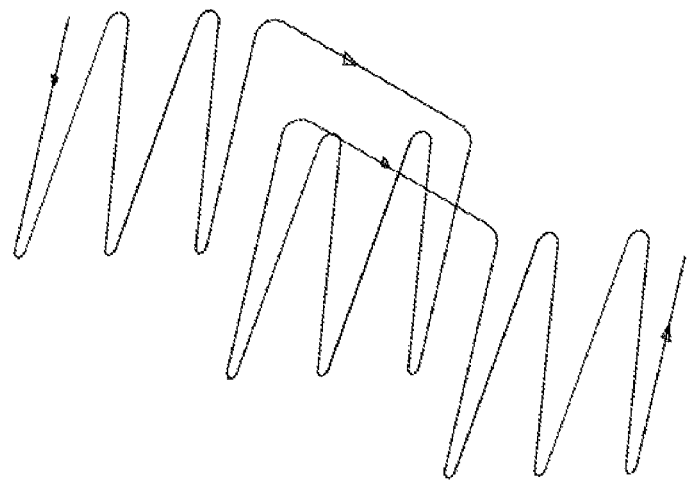
FIG. 3 is a schematic views of moving path and the force analysis of the pull rope of the inflatable mattress according to Embodiment 1 of the present application.
Figure 3:
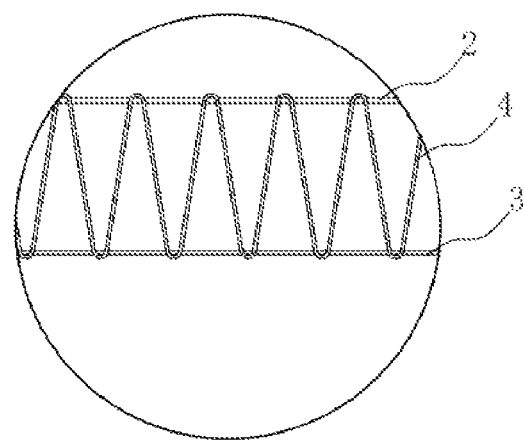

Referring to FIG. 2 and FIG. 3, the pull rope 4 is arranged in the inflatable mattress in a wave-like route. In the present embodiment, a welding manner is ultrasonic welding. The pull rope 4 is made of synthetic fibre such as nylon or polyester, the polyester is selected in the embodiment of the present application, ultrasonic welding is a common connection method, suitable for plastics material of synthetic fibre and the like. During the process of ultrasonic welding, by introducing the vibration of high frequency, heat is generated by friction on the surface of the material, such that local of the material is melted and connected together. For the pull rope of the inflatable mattress, the material of which is synthetic fibre of being prone to weld, ensuring a good connection strength and stability during the process of ultrasonic welding.

Correspondingly, the wave-like route can provide more uniform support. Such a design can disperse stress points of the inflatable mattress, all parts of the body can be more uniformly supported when using the inflatable mattress, while the design of wave-like route is easy for the inflatable mattress more adaptable and resilient. The inflatable mattress can be better adapted to different body sizes and sleeping positions to provide the support of more personalized. In addition, a plurality of connection joints are formed by the pull rope 4, the upper surrounding sheet 2 and the lower surrounding sheet 3, which is easy to disperse the impact of the connection points. By the connections of different position, the stress on some inflatable mattress can be reduced to provide more uniform support, and the pull rope 4 is connected to the upper surrounding sheet 2 and the lower surrounding sheet 3, which can reinforce overall structural stability of the inflatable mattress. The connection method facilitates keeping the shape of the inflatable mattress, and can prevent deformation or collapse during the process of using. Meanwhile, the connection is achieved by the pull rope in the relative technology, compared to a plurality of nozzles arranged on the pull rope, the air can be conveniently circulated inside the inflatable mattress due to the presence of the pull rope, providing a higher inflating efficiency and more convenient use, which indirectly improves the convenience and structural stability of the inflatable mattress.

Figure 4:
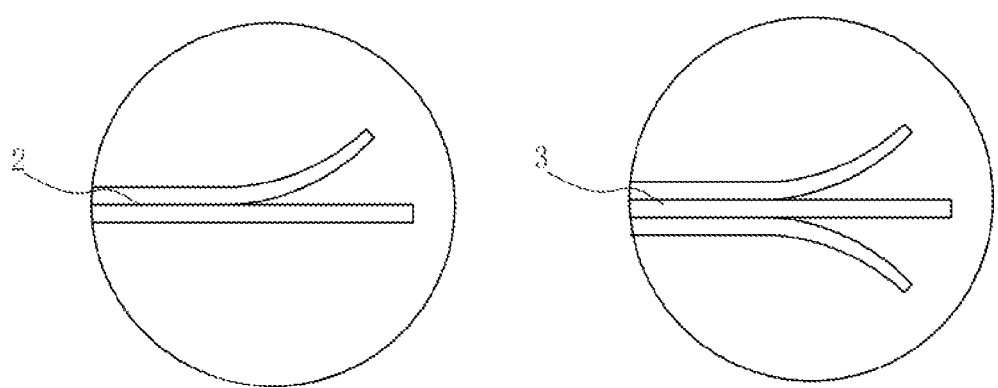
FIG. 4 is a schematic views of layering structure of the upper surrounding sheet and the lower surrounding sheet of the inflatable mattress according to Embodiment 1 of the present application.

Referring to FIG. 4, in addition, in the present embodiment, both of the upper surrounding sheet 2 and the lower surrounding sheet 3 are arranged by a two-layer structure or a three-layer structure. In the two-layer structure, the upper layer is made of cloth or mesh and the lower layer is made of durable PVC or TPU. The materials can increase the softness feeling on the surface of the inflatable mattress, while ensuring sufficient durability and support. In the three-layer structure, the upper layer of cloth or mesh and the lower layer of PVC or TPU are the same as that of two-layer structure, except that a layer made of PVC or TPU is added, the design can maintain softness of the inflatable mattress, further strengthening the overall durability and support ability. Through the structure combination of multiple layers, the inflatable mattress provides a comfortable use experience for a user, and adapts to different environments and requirements, aiming to meet user for the quality of the inflatable mattress and high expectations of durability.

Figure 5:
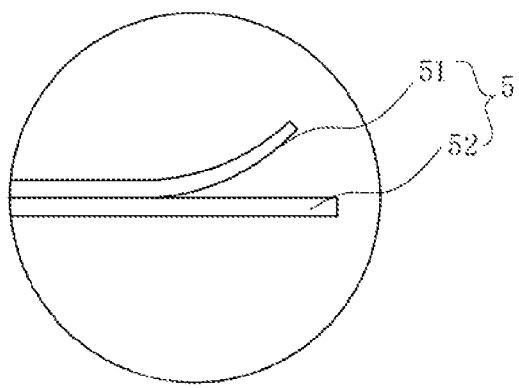
FIG. 5 is a schematic views of layering structure of the upper mesh sheet and the lower mesh sheet of the inflatable mattress according to Embodiment 1 of the present application.
Figure 5:
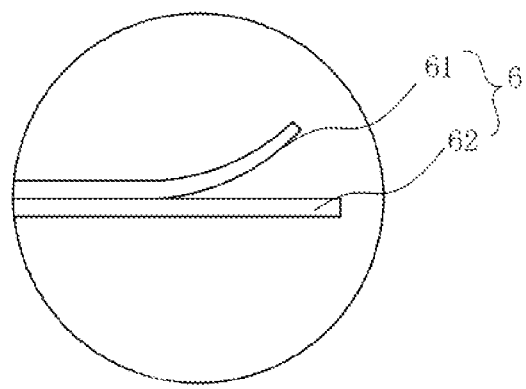

Referring to FIG. 2 and FIG. 5, an inflatable mattress of the embodiment in the present application further includes an upper panel 5 and a lower panel 6, the upper panel 5 and the lower panel 6 are fixed to the upper surrounding sheet 2 and the lower surrounding sheet 3, the upper panel 5 includes a first connection layer 51 and a first mesh layer 52, the first connection layer 51 is fixed on the upper surface of the first mesh layer 52, the lower panel 6 includes a second connection layer 61 and a second mesh layer 62, the second connection layer 61 is fixed on the upper surface of the second mesh layer 62. Simultaneously, the first mesh layer 52 and the second mesh layer 62 are respectively located at the two sides of the pull rope 4, the pull rope 4 is sequentially threaded through and connected to both of the first mesh layer 52 and the second mesh layer 62. In the present embodiment, the first connection layer 51 and the second connection layer 61 are all made of PVC or TPU, and the first mesh layer 52 and the second mesh layer 62 are all made of cloth or mesh.

Accordingly, the connection process can be simplified by using the first mesh layer 52 and the second mesh layer 62, the connection of the upper surrounding sheet 2 and the lower surrounding sheet 3 is easily achieved by the pull rope 4 which is sequentially threaded through and connected to both of the first mesh layer 52 and the second mesh layer 62, combined to the direct connection of the upper surrounding sheet 2 and the lower surrounding sheet 3, since the first mesh layer 52 and the second mesh layer 62 provides more passing points and structures. In addition, by introducing the first connection layer 51 and the second connection layer 61, the connection of the upper panel 5, the lower panel 6 and the upper surrounding sheet 2 and the lower surrounding sheet 3 is more robust, thereby improving the overall structural stability, which is beneficial to prevent the deformation of the inflatable mattress when in use. Moreover, the design of multiple layers can ensure the softness of the inflatable mattress, while fully combining the structural strength and support performance to provide more comprehensive use experience for user.

Further, a periphery of an outer side wall of the upper panel 5 is welded to one sixth length of a circumference of an inner side wall of the upper surrounding sheet 2, and a periphery of an outer side wall of the lower panel 6 is welded to one sixth length of a circumference of an inner side wall of the lower surrounding sheet 3. Therefore, a compartment is formed by the connections of the upper surrounding sheet, the lower surrounding sheet and the upper panel, so that inner structure of the inflatable mattress is more stability. Meanwhile, the welding on the position of one sixth can ensure sufficient connection points are formed by the upper surrounding sheet 2, the lower surrounding sheet 3 and the upper panel 5, the lower panel 6, so that shapes and structures of the inflatable mattress are maintained.

In another aspect, an inflatable mattress of the embodiment in the present application further includes an upper inner surrounding sheet 9 and a lower inner surrounding sheet 10, the upper inner surrounding sheet 9 and the lower inner surrounding sheet 10 are annular, the surface of the upper inner surrounding sheet 9 is welded to the upper surrounding sheet 2, outer side edge of the upper inner surrounding sheet is connected to the outer surrounding sheet 1 by spot welding, the surface of the lower inner surrounding sheet 10 is welded to the lower surrounding sheet 3, the outer side edge of the lower inner surrounding sheet 10 is connected to the outer surrounding sheet 1 by spot-welding. Specifically, the upper inner surrounding sheet 9 and the lower inner surrounding sheet 10 are connected to a position at one third height of the outer surrounding sheet 1.

Therefore, the upper inner surrounding sheet 9 can pull the upper surrounding sheet 2 and the outer surrounding sheet 1 in an opposite direction, the lower inner surrounding sheet 10 can pull the lower surrounding sheet 3 and the outer surrounding sheet 1 in an opposite direction, such that the upper surrounding sheet 2, the lower surrounding sheet 3 and the outer surrounding sheet 1 are tensioned, improving the overall structural stability of the inflatable mattress; Meanwhile, the space enclosed by the upper inner surrounding sheet 9 and the outer surrounding sheet 1, the lower inner surrounding sheet 10 and the outer surrounding sheet 1 are provided for inflation conditions in a manner of spot welding, such that the inflatable mattress can inflate stably, namely, the air is passed through the clearance between the upper surrounding sheet 2 and the outer surrounding sheet 1, and further passed through the clearance between the lower surrounding sheet 3 and the outer surrounding sheet 1.

Further, a periphery of an outer side wall of the upper inner surrounding sheet 9 is welded to one fourth length of a circumference of an inner side wall of the upper surrounding sheet 2, and a periphery of an outer side wall of the lower inner surrounding sheet 10 is welded to one fourth length of circumference of an inner side wall of the lower surrounding sheet.

Therefore, a periphery of an outer side wall of the upper inner surrounding sheet 9 is welded to one fourth length of a circumference of an inner side wall of the upper surrounding sheet 2, and a periphery of an outer side wall of the lower inner surrounding sheet 10 is welded to one fourth length of circumference of an inner side wall of the lower surrounding sheet 3, which can balance support points of the inflatable mattress, reduce the stress on welding spots, thereby improving the overall comfort. Meanwhile, the upper inner surrounding sheet 9 is connected to the lower inner surrounding sheet 10 by welding, which can realize the support of separating and structural flexibility, which is easy to adapt different body size and pressure distribution for the inflatable mattress when in use.

Implementing principle of an inflatable mattress in embodiment 1 of the present application is as follows.

Wave-like route can provide more uniform support. The design can disperse stress points of the inflatable mattress, all parts of the body can be more uniformly supported when are in use of the inflatable mattress, and the pull rope is passed through and connected to the upper surrounding sheet and the lower surrounding sheet, which is beneficial to dispersing the impact of the connection points. The connections at different positions can reduce local stress on the inflatable mattress to provide more uniform support. Meanwhile, the connection is achieved by the pull rope in the relative technology, compared to a plurality of nozzles arranged on the pull rope, the air can be convenient to communicate with the inside the inflatable mattress via the pull rope, providing a higher inflating efficiency and more convenient use, therefore, the convenience and structural stability of the inflatable mattress are indirectly improved.

Embodiment 2

Figure 6:
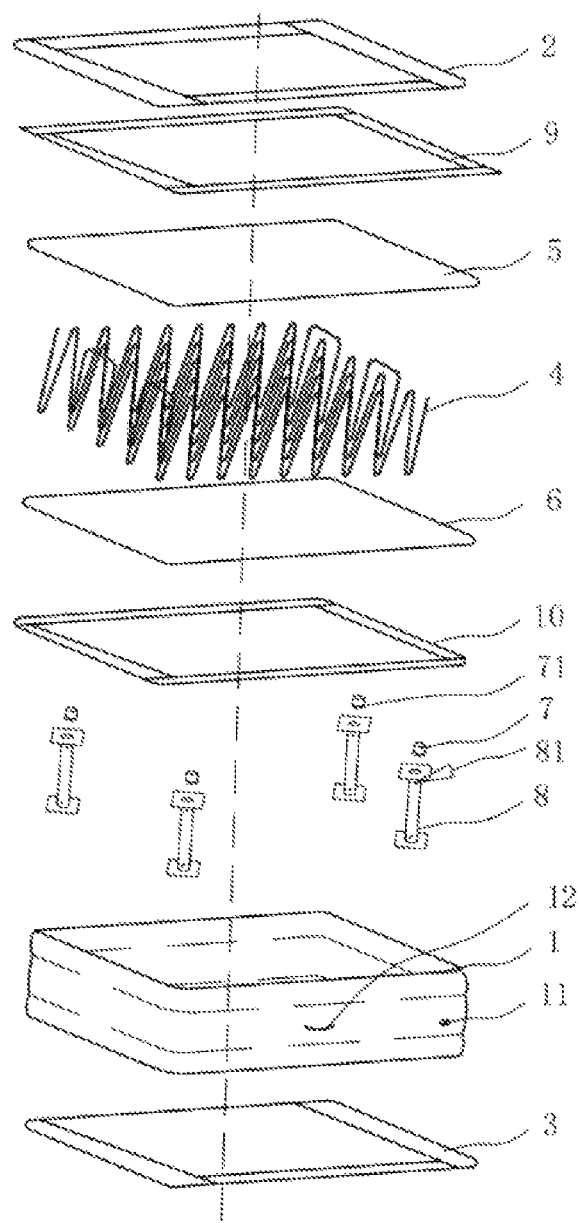
FIG. 6 is a schematic exploded view of the inflatable mattress according to Embodiment 2 of the present application.

Referring to FIG. 6, the present application is the same as that of the embodiment 1, except that the lower surrounding sheet 3 is provided with a weight block 7, the weight block 7 is cylindrical in shape, there is a plurality of weight blocks, and a plurality of weight blocks are distributed in an array around the lower surrounding sheet 3. In the present embodiment, there are four weight blocks, which are fixed on the four corners of the lower surrounding sheet 3 by sticking.

Therefore, arranging the weight block 7 at the corners of the inflatable mattress is further beneficial to reducing the risk of air leakage, the above arrangement can ensure that the inflatable mattress is fixed on the ground when in use, reducing the problems of wear and tear and escaping at the joint because of moving. Meanwhile, the weight blocks are arranged on the four corners of the inflatable mattress, which can increase the center of gravity of the mattress and improve the overall stability, playing a positive effect of preventing the mattress from sliding or inclining when in use. In addition, the weight of four corners of the mattress is increased, which is prone to reduce the possibility of the sudden moving when in use, which is helpful in solving safety issues that the mattress is moved or flipped while at night or physical active on the mattress.

Further, a magnetic layer 71 is provided on the surface of the weight block 7. After the inflatable mattress is deflated and folded, it becomes soft and deformed. By the arrangement of the magnetic layer 71, two weight blocks are attached each other after folded, forming a stable structure, which is beneficial to maintain the shape of the inflatable mattress, and prevent irregular deformation during storage or transportation.

Meanwhile, a side wall of the outer surrounding sheet 1 is provided with a handle 12, the handle 12 is set in the U-shaped, the handle 12 is fixed to the outer surrounding sheet 1 by welding, after the inflatable mattress is folded, the handle 12 is held for user and is convenient to carry the inflatable mattress.

In another aspect, a guide sleeve 8 is arranged between the upper surrounding sheet 2 and the lower surrounding sheet 3, the guide sleeve 8 is fixed to the upper surrounding sheet 2 and the lower surrounding sheet 3 by ultrasonic welding, and the guide sleeve 8 has a T-shape cross-section, open upper and lower ends, and cylindrical inner space. Meanwhile, the numbers and positions of the guide sleeves 8 correspond to those of the weight blocks 7, and the weight block 7 is slidably provided in the guide sleeve 8.

Therefore, the guide sleeve 8 is designed as a guide passage which can guide the weight block 7 to slide in a certain direction, which ensure that the weight block 7 is moved along the planned route during the process of flipping the inflatable mattress, however is not slid randomly or piled in a side of the inflatable mattress. Both sides of the inflatable mattress can be used for users, when in use, the weight blocks are located at the lower portion of the inflatable mattress with the gravity of its own.

Furthermore, a plurality of air holes 81 are defined on the outer surrounding of the guide sleeve 8. When the inflatable mattress is inflated, the air can enter the guide sleeve 8 via the air hole 81, so that the inner of the guide sleeve 8 is supported by air. Since four corners of the traditional inflatable mattress is easy to collapse by affecting of stress, four corners of the inflatable mattress can be supported through the guide sleeve 8 in the present application, indirectly improving the structural strength of the inflatable mattress.

Embodiment 3

Figure 7:
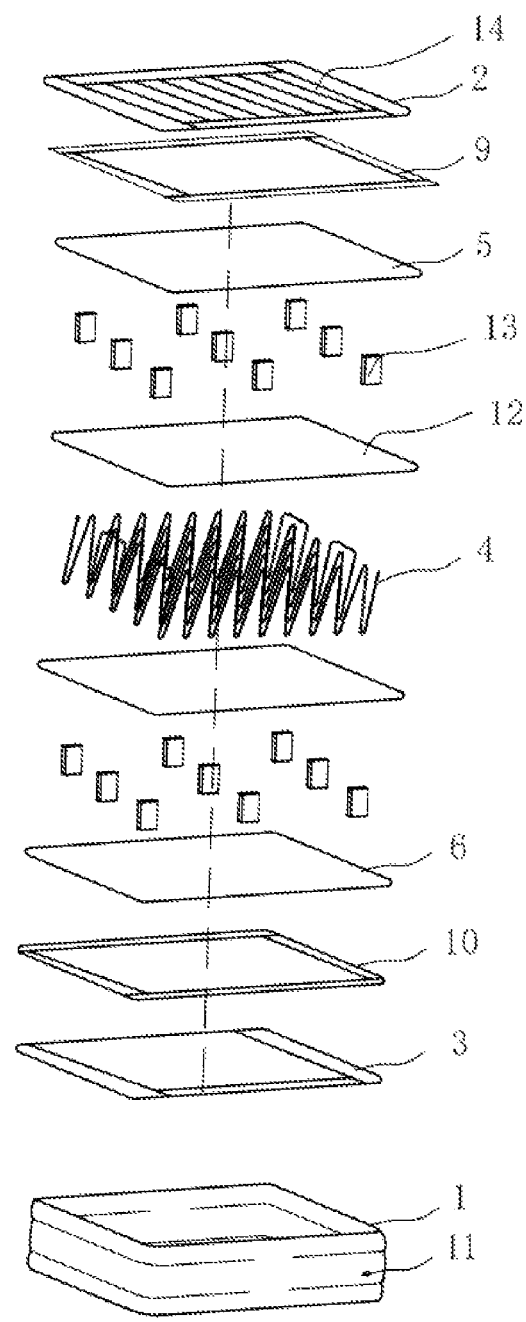
FIG. 7 is a schematic exploded view of the inflatable mattress according to Embodiment 3 of the present application.

Referring to FIG. 7, the present embodiment differs from Embodiment 1 by further comprising a separating sheet 12 and a perforated pull strap 13, two separating sheets 12 are provided, the outer side wall of the two separating sheets 12 are fixed to the inner side wall of the outer surrounding sheet 1, a plurality of the perforated pull strap 13 are provided, in which two ends of parts of the perforated pull strap 13 are fixed to the top surface of one separating sheet 12 and the upper surrounding sheet 2, and two ends of the maintaining parts of the perforated pull strap 13 are fixed to the bottom of the outer separating sheet 12 and the lower surrounding sheet 1.

Therefore, the providing of the separating sheet 12 and the fixing of the perforated pull strap 13 achieve isolation and connection inside the mattress, thereby improving the overall structural stability and uniform inflation effects. The arrangement help improve the comfort and stability of the mattress, such that it is more uniform and robust when in use.

Furthermore, wave-like folds 14 are provided on the surfaces of the upper surrounding sheet 2 and the lower surrounding sheet 3. Correspondingly, wave-like folds are added to the periphery of the mattress, which is beneficial to realize more uniform surface compactness when the inflatable mattress is inflated. The wave-like folds 14 will be softer after the mattress is inflated, while reducing laxness of the surface. Extra structural support is provided and the overall stability of the mattress is further improved to provide more comfortable sleeping experience for user. The wave-like folds 14 are further beneficial to prevent the mattress from depressions or irregular shapes during the process of using, improving the texture and appearance of mattresses.

The above are the preferred embodiments of the present application, which are not intended to limit the protection scope of the present application. Therefore, all equivalent changes made according to the structure, shape and principle of the present application should be covered within the protection scope of the present application.

What is claimed is:

1. An inflatable mattress, comprising: an outer surrounding sheet, an upper surrounding sheet, a lower surrounding sheet, a pull rope, an upper panel and a lower panel, wherein the outer surrounding sheet is annular, a side wall of the outer surrounding sheet is provided with an inflating nozzle, the upper surrounding sheet is welded at a top of the outer surrounding sheet, the lower surrounding sheet is welded at a bottom of the outer surrounding sheet, the pull rope is passed through and connected to the upper surrounding sheet and the lower surrounding sheet, and arranged in a wave-like route inside the inflatable mattress, the upper panel and the lower panel are respectively fixed to the upper surrounding sheet and the lower surrounding sheet, the upper panel comprises a first mesh layer, the lower panel comprises a second mesh layer, the first mesh layer and the second mesh layer are respectively located at two sides of the pull rope, and the pull rope is sequentially passed through the first mesh layer and the second mesh layer and is connected to both of the first mesh layer and the second mesh layer.

2. The inflatable mattress according to claim 1, wherein a periphery of an outer side wall of the upper panel is welded to one sixth length of a circumference of an inner side wall of the upper surrounding sheet, and a periphery of an outer side wall of the lower panel is welded to one sixth length of a circumference of an inner side wall of the lower surrounding sheet.

3. The inflatable mattress according to claim 1, wherein further comprising an upper inner surrounding sheet and a lower inner surrounding sheet, wherein both of the upper inner surrounding sheet and the lower inner surrounding sheet are annular, a surface of the upper inner surrounding sheet is welded to the upper surrounding sheet, an outer side edge of the upper inner surrounding sheet is spot-welded to the outer surrounding sheet, a surface of the lower inner surrounding sheet is welded to a surface of the lower surrounding sheet, and an outer side edge of the lower inner surrounding sheet is spot-welded to the outer surrounding sheet.

4. The inflatable mattress according to claim 3, wherein a periphery of an outer side wall of the upper inner surrounding sheet is welded to one fourth length of a circumference of an inner side wall of the upper surrounding sheet, and a periphery of an outer side wall of the lower inner surrounding sheet is welded to one fourth length of a circumference of an inner side wall of the lower surrounding sheet.

5. The inflatable mattress according to claim 1, wherein the lower surrounding sheet is provided with a plurality of weight blocks arranged in an array around the lower surrounding sheet.

6. The inflatable mattress according to claim 5, wherein a guide sleeve is arranged between the upper surrounding sheet and the lower surrounding sheet, and each of the plurality of weight blocks is slidably provided in the guide sleeve.

7. The inflatable mattress according to claim 6, wherein a plurality of air holes are defined in a periphery of the guide sleeve.

8. The inflatable mattress according to claim 1, wherein further comprising two separating sheets and a plurality of perforated pull straps, an outer side wall of the two separating sheets are fixed to an inner side wall of the outer surrounding sheet, wherein two ends of some of the plurality of perforated pull straps are fixed to a top surface of one of the two separating sheets and the upper surrounding sheet, and two ends of other perforated pull straps of the plurality of perforated pull straps are fixed to a bottom of a second one of the two separating sheets and the lower surrounding sheet.

9. The inflatable mattress according to claim 8, wherein wave-like folds are provided on surfaces of the upper surrounding sheet and the lower surrounding sheet.

\* \* \* \* \*